Patented May 15, 1945

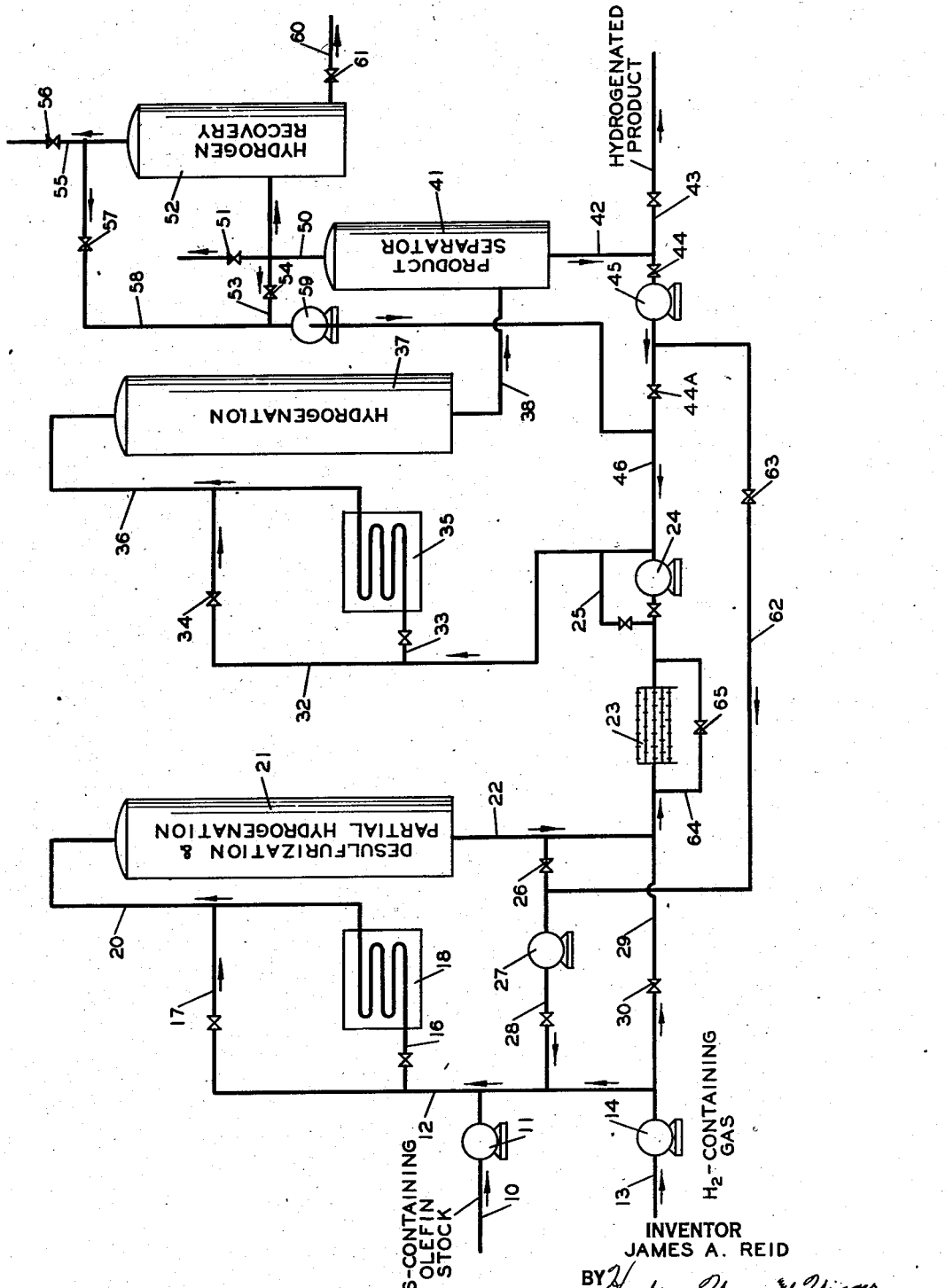

2,376,086

UNITED STATES PATENT OFFICE 2,376,086

PROCESS FOR HYDROGENATION OF OLEFINS

James A. Reid, Bartlesville, Okla., assignor to Phillips Petroleum Company, a corporation of Delaware Application February 13, 1942, Serial No. 430,810

1 Claim. (Cl. 260—683.6)

This invention relates to a process for the non-destructive hydrogenation of olefins. It relates more specifically to a process for the hydrogenation of sulfur-containing olefinic stocks under such conditions that deactivation of the catalyst by sulfur is minimized.

It is an object of this invention to provide a system for the catalytic hydrogenation of sulfur-containing olefinic stocks.

It is a further object of this invention to provide a means for preventing deactivation of a hydrogenation catalyst by sulfur poisoning.

It is a further object of this invention to provide a means for increasing the useful life of a catalyst in the hydrogenation of a sulfur-containing olefinic stock.

It is a further object of this invention to provide a means for simultaneous desulfurization and hydrogenation of a sulfur-containing olefinic stock.

Another object of this invention is to provide a process whereby unsaturated hydrocarbons are desulfurized in the presence of hydrogen in one stage of a process and in another stage of the process are reacted with hydrogen in the presence of a catalyst.

Other objects will be evident to one skilled in the art from the following disclosure.

In order to increase the power output and efficiency of internal-combustion engines, it has been necessary to increase the pressures and temperatures prevailing in the combustion chamber. In spark-ignition engines, the increase in cylinder pressures is limited by the detonation characteristics of the fuels, normally measured in terms of octane numbers. The detonating characteristics of hydrocarbons depend primarily upon the molecular species, that is, aromatic, olefinic, naphthenic or paraffinic, upon the extent of carbon chain branching in the individual molecules, and to lesser extents upon the molecular weight, concentrations in admixture with other hydrocarbons, and so forth. In addition to these factors relating directly to detonation, other characteristics of the fuel which must be considered are volatility, gum-forming tendency, and change in octane number with addition of anti-knock agents such as tetraethyl lead.

It has been found that the paraffin hydrocarbons, which are normally liquid, boil below about 400° F., and have one or more branches in their molecular structure and are very satisfactory as fuels for high-compression engines. In some applications, similar fuels of considerably higher boiling ranges are desirable. Such hydrocarbons are extremely resistant to gum formation in storage, they have high octane numbers in the pure state, and a considerable increase in octane number may be obtained by the addition of small proportions of tetraethyl lead.

Although minor amounts of such branched-chain paraffinic hydrocarbons occur in naturally occurring hydrocarbon mixtures, the major source of the highly branched structure, high octane number paraffinic hydrocarbons is through synthesis from lower molecular weight olefins. The polymerization of suitable olefins, such as isobutylene, normal butenes, propylene, and in some cases, ethylene and olefins containing five or more carbon atoms per molecule, is well known in the art. It is frequently desirable to subject these olefin polymers to a hydrogenation treatment in order to saturate the olefinic bond, so as to improve the storage stability, the increase in octane number on addition of tetraethyl lead, and other qualities.

The non-destructive hydrogenation of other olefinic hydrocarbon products, such as high octane products from cracking processes, particularly catalytic, and from alkylation processes, especially thermal, may be accomplished through application of the hereinafter disclosed process. Modifications of the process may also be adapted to the non-destructive hydrogenation of high-boiling hydrocarbons, including lubricating oils, viscous polymers of olefins and other unsaturated hydrocarbons, and similar products.

It is frequently desirable that the paraffinic hydrocarbons used for solvents, for high octane number fuels, and in various other applications be substantially free from impurities. The exclusion of oxygen and sulfur compounds especially is desirable in many cases. For example, the deleterious effects of sulfur on the increase in octane number resulting from the addition of tetraethyl lead to motor fuels is well known. The removal of minor amounts of such impurities is also accomplished through the operation of this process.

The non-destructive hydrogenation of unsaturated or olefin-containing hydrocarbons is conventionally conducted in the presence of a catalytic material which increases the rate at which hydrogen combines with the olefinic hydrocarbon and permits a decrease in the temperature and pressure necessary to accomplish the desired reaction, thereby facilitating the reaction and minimizing other changes accompanying the hydrogenation. Two types of catalysts are used in these systems, the one type, such as chromium oxide, molybdenum sulfide, tungsten oxide and the like, requiring relatively high temperatures but being affected only in minor degree by sulfur compounds, and the other type, such as reduced nickel, cobalt, copper, platinum and similar preparations, which in the active state require relatively low temperatures for hydrogenation but which are very susceptible to poisoning and deactivation, particularly by sulfur compounds. It is with catalysts of the second type, particularly those containing nickel, that this invention is concerned.

The hydrogenation catalysts of this second type contain nickel, copper, cobalt, and similar elemental metals, alone or in combination with other metals, in an active state. The desired activity is in general secured by converting a metal salt or a mixture of the desired metal salts to oxides, hydroxides, or carbonates, in a relatively pure state, or more frequently in admixture with a supporting material for increasing the surface, and in some cases the activity, of the catalytic material. Materials commonly used as catalyst supports include kieselguhr, diatomaceous earth, pumice, charcoal, porcelain and the like. The oxides, hydroxides, or carbonates may then be reduced in hydrogen or a hydrogen-containing gas to provide the desired catalytically active product. One example of such a hydrogenation catalyst is described in U. S. Patent 2,242,627.

Catalysts so prepared function quite satisfactorily in bringing about the addition of hydrogen to olefins in the preparation of paraffin hydrocarbons if catalyst poisons are rigorously excluded from the system. Conventionally, the olefin-containing charge, together with sufficient diluent or saturated product to prevent excessive temperature increase as a result of the heat liberated by the hydrogenation, is passed with an amount of hydrogen in excess of that necessary for complete hydrogenation of the unsaturated hydrocarbons, through the catalyst mass. The pressure in the system may range from atmospheric to 1000 or even 2000 pounds per square inch gauge, although pressures in the range of 200 to 800 pounds per square inch gauge are conventionally used. The temperature, which is usually maintained at a sufficiently high value to produce the desired extent of hydrogenation, is in the range of 250° to 650° or in some cases as high as 700° F. It is desirable to maintain the temperature at as low a value as possible, since hydrocarbon decomposition and deactivation of the catalyst increase with increase in temperature above about 500° F., and especially above about 600° F. Under these conditions of operation, part of the hydrocarbons are normally in liquid phase and part in vapor phase, although in the higher temperature and lower pressure ranges all of the charge and product may be in the vapor phase.

The hydrogenation of sulfur-free olefin stocks appears to occur within a relatively narrow zone in the catalyst bed, as judged by the sharp local rise in temperature which occurs in an internal zone in the catalyst mass during hydrogenation. Initially, this zone is in the region of catalyst which is first contacted by the charge. As the catalyst in the initial part of the bed becomes deactivated or reduced in activity, the zone of rapid reaction moves progressively down-stream in the catalyst bed, until finally the effluent product is inadequately hydrogenated. Increasing the temperature of the catalyst brings about an increase in the extent of hydrogenation, even after the catalyst has become partially deactivated.

Continued increase of temperature is not possible, however, since catalyst deactivating reactions increase with increase in temperature. A highly active nickel catalyst, for example, produces appreciable decomposition of olefin polymers at temperatures as low as 500° F.; the decomposition of hydrocarbons, together with deactivation of the catalyst, becomes appreciable at about 600° F. in the presence of a moderately active nickel-containing hydrogenation catalyst. Thus, the maximum temperature in the hydrogenation system is limited by product loss and catalyst deactivation to a value in the range of 600 to 700° F., even with a nearly deactivated catalyst.

Sulfur compounds are found in many naturally occurring hydrocarbons, ranging in concentration from very low values to proportions of 5 or even 10 per cent. In the preparation of olefinic stocks for hydrogenation, the sulfur content of the hydrocarbons and of the hydrogen-containing gas is reduced to as low a value as practical, in view of the known deleterious effect of sulfur and sulfur compounds on hydrogenation catalysts containing nickel, copper, cobalt, and similar metals. In some commercial operations it has been found that the sulfur content of olefin-containing stocks could not economically be reduced to a value below 0.002 to 0.005 per cent by weight. Even higher sulfur values may result for short times as a result of irregularities in operation of the desulfurization and other processing steps.

In the hydrogenation of such sulfur-containing olefin charge stocks at temperatures in the range of from about 250 to about 500° F., using an active nickel-containing catalyst, the zone of hydrogenation or of temperature increase in the catalyst rapidly traverses the catalyst bed in the direction of flow of the charge, with the result that the catalyst loses its capacity to bring about the desired extent of hydrogenation of the charge olefin in a very short period of operation, usually during the hydrogenation of 10 to 20 volumes of olefinic charge. During this time a very small proportion of the nickel, usually less than 5 per cent, has been converted to sulfur compounds. In contrast, in the hydrogenation of similar olefin charge containing less than 0.0005 per cent sulfur, the same catalyst retains its activity during the hydrogenation of more than 1000 volumes of olefinic charge, while operating in the same temperature range.

After the hydrogenation of sulfur-containing olefins has become incomplete while operating in the temperature range of from about 250 to about 500° F., the effluent from the hydrogenation treatment contains a substantial proportion of the sulfur compounds in the charge, so that poisoning and deactivation of a second catalyst would result from attempting to complete the hydrogenation of the charge. It has been found that the hydrogen sulfide and more reactive mercaptan sulfur compounds are rapidly removed by contact with nickel. However, other of the sulfur compounds, such as sulfides, disulfides and especially cyclic sulfur compounds, do not react readily with nickel or other metals under those conditions. It appears to be these latter types of sulfur compounds which resist the action of the various desulfurizing treatments.

I have found that in the non-destructive hydrogenation of sulfur-containing olefinic stocks by means of active catalysts containing nickel, copper, cobalt, and similar elemental metals, it is necessary to maintain the hydrogenation system at a temperature above about 500° F. and usually above about 530° F., depending primarily on the activity of the hydrogenation catalyst, to minimize the deactivation of the catalyst resulting from the poisoning effects of sulfur compounds, and to substantially completely desulfurize the olefinic charge. At those temperatures and above, substantially all the sulfur in olefinic charge stocks is rapidly converted to metal sulfides or other sulfur derivatives by combination with the elemental metal of the catalyst, so that the remainder of the catalyst retains its activity for prolonged periods. As a result of the heat liberated during the hydrogenation, however, the temperature of the reacting mixture may be increased 50° to 100° F. or more, depending upon the olefin content of the charge. The portion of the catalyst in and downstream from the hydrogenation zone under these conditions may be maintained at temperatures above about 550° or even above about 600° F. throughout the time of operation. Under such conditions, the catalyst gradually becomes reduced in activity in the absence of sulfur compounds as a result of hydrocarbon decomposition, carbon deposition on the catalyst, carbide formation and the like. Thus, although rapid deactivation resulting from poisoning by sulfur is eliminated by operation at temperatures above about 500° F., such operation results in the most active part of the catalyst in the reaction vessel being subjected to such high operating temperatures that relatively short catalyst lives are obtained in contrast to similar hydrogenations conducted with sulfur-free stocks at lower temperatures. It is postulated that the high temperature is necessary to bring about the reaction, perhaps after decomposition, of the less-reactive sulfur compounds by means of hydrogenation catalyst of only moderate catalytic activity. It has further been found that in operations above 500° F., catalysts which have become incapable of bringing about complete hydrogenation of the unsaturated hydrocarbons in the charge are active for the removal of sulfur from the charge until more than half the total nickel, copper, and other sulfur-reactive metals have been converted to sulfides or other sulfur compounds. During such operations, the substantially complete removal of sulfur from the charge may be achieved even though as little as 10 per cent of the olefin charged is being hydrogenated.

A process has now been developed for securing very long catalyst life in the non-destructive hydrogenation of sulfur-containing olefinic stocks through contacting the olefin-containing hydrocarbon gas with a hydrogenating catalyst of moderate to low activity at a temperature above about 500° or preferably above about 530° F. to secure substantially complete desulfurization and limited hydrogenation of the charge; cooling the desulfurized product from the first step by external means or through the addition of sulfur-free paraffinic diluent; and then contacting the hydrogen-hydrocarbon mixture with an active metal hydrogenation catalyst at a lower temperature, usually in the range of from about 250° to about 500° F. It may be desirable to add additional hydrogen or hydrogen-containing gas prior to treatment in the second stage, especially if insufficient hydrogen for complete saturation of the olefinic compounds was added in the initial steps. In this process, the catalyst in the desulfurization and partial hydrogenation stage may be prepared for that purpose, but preferably it is the catalyst which has previously been used as an active hydrogenation catalyst in the second stage.

The system is normally operated either until a major portion of the sulfur-reactive metal in the first stage has been converted to sulfur compounds and the desulfurization becomes incomplete, or the sulfur content of the effluent increases above a value of 0.0005 to 0.0010 per cent by weight, or until the desired extent of hydrogenation cannot be secured in the second stage of the process. Since under favorable conditions one volume of catalyst is capable of catalyzing the hydrogenation of 1000 or more volumes of olefinic hydrocarbons, the catalyst in the first stage usually fails to bring about complete desulfurization of the hydrocarbon mixture before the extent of hydrogenation in the second stage falls below the operating limit. It has been observed that in some cases, especially when the desulfurization and hydrogenation catalyst in the first stage contains alumina along with the nickel, cobalt, copper or other hydrogenating metal or mixture, the catalyst at operating temperatures of 600° F. and above will convert the sulfur compounds substantially completely to mercaptans and hydrogen sulfide for a limited time after complete desulfurization has failed. This property may be utilized by placing in another reactor between the first and second stages a material capable of removing the hydrogen sulfide and mercaptans from the system, such as suitably prepared iron and alkaline extracting solutions.

After complete desulfurization is no longer being obtained, or at the time of incipient failure, the catalyst in the first stage of the process may be removed from the system for regeneration, metal reclamation and the like, the catalyst in the second stage may be shifted to be used as the catalyst for the first stage, and a new portion of hydrogenation catalyst introduced for use in the second stage. In case it has been necessary to increase the temperature of the hydrogenation catalyst in the second stage to a value of 600° F., for example, to secure substantially complete hydrogenation of the olefinic hydrocarbons, it is not desirable to use it subsequently as a catalyst for desulfurization and partial hydrogenation in the first stage at a temperature significantly lower than the temperature at which it was previously used.

In controlling the temperatures in this process as indicated, the olefin content of the charge and the extent of hydrogenation must be limited so as to prevent excessive temperature increase, since temperature increases as high as 200° F. or more can result from heat liberation on hydrogenation in the substantially adiabatic systems. The addition of paraffinic diluent has been found the most satisfactory means of temperature control. Thus, in the charge to the second stage or complete hydrogenation, the olefin content of the charge is maintained at values in the range of 20 to 35 per cent, depending upon the temperature of operation. At the lower temperatures, especially below 400° F., higher proportions of olefins may be used, since the latent heat of vaporization tends to limit the increase in temperature.

The hydrogenation rate employed in this process depends in part upon the characteristics of the charge stock, the limitations of the various parts of the system, and so forth. Normally from one half to five volumes of olefinic hydrocarbon per volume of catalyst per hour may be completely saturated in this system. The usual operating rates are two to four volumes of olefin per volume of catalyst per hour.

The operation of this process is schematically illustrated in the drawing. The sulfur-containing olefinic charge is introduced through line 10 to pump 11, which forces the hydrocarbon stream at the desired pressure, usually between 200 and 800 pounds per square inch, into line 12. Hydrogen or hydrogen-containing gas, usually somewhat in excess of that needed to completely hydrogenate the olefins in the charge, is conducted by means of line 13 to pump 14 which forces the hydrogen into line 12 where it commingles with the hydrocarbon mixture. In case the olefin content of the charge introduced through line 10 is sufficiently high and the extent of hydrogenation sufficient that temperatures in excess of 650° F. result from the heat of hydrogenation, hydrogenated diluent from the second stage may be returned to the first stage through line 62 controlled by valve 63, or hydrocarbon containing a lower proportion of olefinic compounds than the charge to the first stage may be withdrawn from line 22 through valve 26 and forced by means of pump 27 through line 28 into line 12. The total charge in line 12 may then be passed through 16 into heater 18 wherein it is heated to the desired temperature, somewhat in excess of 500° F. For control, part of the charge may flow from line 12 through line 17 to join the hot charge in line 20. The charge is transferred through line 20 to the catalyst-containing vessel 21 usually containing a catalyst of low to moderate hydrogenation activity at a temperature above 500° F., so controlled as to prevent rapid deactivation of the catalyst through poisoning by sulfur. There all the sulfur is removed from the charge, and a partial hydrogenation of the olefins, preferably in excess of 10 per cent, occurs.

The desulfurized and partially hydrogenated charge is conducted by pipe 22 to cooler 23, or through by-pass line 64 controlled by valve 65, and through line 25 or, if necessary, through pump 24 to line 32. Additional hydrogen or hydrogen-containing gas may be introduced into this stream through line 29 controlled by valve 30. Completely hydrogenated diluent together with recycle hydrogen or hydrogen-containing gas may be added to the charge in line 32 through line 46. This charge may be passed from line 32 through valve 34 directly to the second stage hydrogenation chamber 37, or if a higher temperature is needed the charge or a portion of it may pass through line 33 and heater 35 to line 36. The charge at the desired temperature, between about 250 and about 600° F. and usually between about 250 and about 500° F., is passed into catalyst chamber 37 for complete hydrogenation of the olefinic hydrocarbons. It is desirable to hold the temperature of the charge to this system at as low a value as will provide adequate hydrogenation, so as to minimize hydrocarbon decomposition and catalyst deterioration which result from contacting active hydrogenation catalyst with hydrocarbons at relatively high temperatures.

The saturated hydrocarbon effluent flows from chamber 37 through line 38 to separator 41 where, after adequate cooling, the desired product is separated by fractionation or stage separation and withdrawn through line 42 and valve 43. The saturated product which is desired for recycle to prevent excessive temperatures in the hydrogenation stages is passed through valve 44 and transferred by means of pump 45 through line 62 controlled by valve 63 to the first stage or through valve 44A and line 46 to the second stage. The excess hydrogen and other gaseous materials separated from the product in separator chamber 41 is withdrawn through line 50 and may be released through valve 51. A portion of the total gas may be passed through line 53 and valve 54 to line 58 for recycle to the second stage. The hydrogen-containing gas may be treated in hydrogen recovery system 52 so as to reject extraneous gases through line 60 controlled by valve 61, thereby securing a gas containing a greater proportion of hydrogen which may be removed through bleed-off valve 56 or may be recycled through line 55 and valve 57 to line 58 for transfer by means of compressor 59 into the second-stage hydrogenation system through line 46.

Various modifications in this schematic presentation are obvious. In most operations of this type the process is continuous, so that at least three catalyst chambers are desirable to permit recharging or catalyst regeneration during operation. The piping connections should preferably be such that any one of the catalyst chambers could be used in the first or the second stage of this process. Heat exchangers may be used in the system to reduce the amount of heating and cooling required. Modifications and changes may be made in the process steps without altering the essentials of this process.

To demonstrate the value of the process in the hydrogenation of sulfur-containing stocks, the following results are typical and illustrate the advantages of the process of the invention.

*Comparative Experiment I*

A catalyst was prepared by depositing nickel and copper nitrates on an activated alumina support equivalent to 3.0 pounds of metallic nickel and 1.0 pound of copper per gallon of finished catalyst. This preparation was roasted in air at 700° F. to decompose the nitrates, and the resultant nickel and copper oxides were reduced to the metals in hydrogen at 550 to 600° F. This catalyst was used to hydrogenate a sulfur-free olefinic polymer, passing through the catalyst mass one volume of olefin per volume of catalyst per hour, mixed with three volumes of previously hydrogenated polymer, together with about 130 per cent of the theoretical amount of hydrogen required to saturate the olefin in the charge. The hydrogenation was started at a temperature of 275° F.; during the hydrogenation of 1145 volumes of olefinic charge to a minimum of 99.5 per cent paraffinic hydrocarbons, the temperature of the charge to the hydrogenation system was gradually increased to a maximum value of 525° F. From this operation it was evident that the activity of the hydrogenation catalyst was adequate to hydrogenate over 1000 volumes of olefinic polymer with negligible loss through product decomposition.

*Comparative Experiment II*

A catalyst mass identical with that described in Comparative Experiment I was used under the same initial conditions that were used to hydrogenate the olefinic charge, but in this operation the olefinic charge contained 0.006 per cent by weight of sulfur in the form of organic sulfur compounds not removed by washing with alkaline reagents. After five volumes of olefin had been treated in the system the hydrogenation zone, as judged by region of temperature increase in the catalyst bed, had already traversed more than half the total catalyst volume. The temperature of the charge was then increased gradually to 450° F. by the time 10 volumes of olefin had been hydrogenated. However, after 14 volumes of olefin had become hydrogenated, the olefin content of the effluent product increased rapidly, and even at a charge inlet temperature of 600° F., the product contained about 7 per cent olefinic hydrocarbons. Thus this catalyst became deactivated for complete hydrogenation of the sulfur-containing charge during the treatment of only 14 volumes of olefin. During subsequent operation at 600° F. and above, even though only partial hydrogenation was obtained, the sulfur content of the effluent was consistently below 0.0010 per cent by weight.

*Comparative Experiment III*

The same experimental conditions, catalyst, and charges were used in this operation as in Comparative Experiment II, except that the charge mixture was heated to a temperature of 530° F. instead of 275° F. at the beginning of the operation. The operation was continued at an inlet temperature of 530° F., with increase in temperature in the catalyst bed of 80 to 90° F. as a result of the heat liberated on hydrogenation. After 110 volumes of olefin had been satisfactorily hydrogenated it was necessary to increase the inlet temperature gradually to keep the olefin content of the effluent at a value less than 0.5 per cent. An inlet temperature of 585° F., and effluent temperature of 670° F. was obtained by the time 195 volumes of olefin had been satisfactorily hydrogenated. The catalyst became deactivated quite rapidly thereafter, as a result of the high operating temperature. It is thus evident that the rapid deactivation resulting from poisoning by sulfur compounds was eliminated by maintaining the inlet temperature at a minimum of 530° F. However, the operation at that elevated temperature caused a marked reduction in catalyst life, in comparison with the results of Comparative Experiment I.

*Example*

Two hydrogenation systems were assembled in sequence, so arranged that desulfurization and partial hydrogenation occurred in the first stage and the hydrogenation was completed in the second stage. The catalyst described in Comparative Experiment I was used in both catalyst chambers. One volume of an olefinic charge containing .009 per cent of total sulfur by weight, mixed with three volumes of paraffinic diluent and 125 per cent of the theoretical quantity of hydrogen required to hydrogenate the charge, was passed through the first catalyst at an inlet temperature of 540° F. The charge rate was so adjusted that 2 volumes of olefin were treated per volume of catalyst per hour. After 90 volumes of the charge had been substantially completely hydrogenated and desulfurized, the extent of hydrogenation began to decrease, although the desulfurization continued to be satisfactory. The inlet temperature was increased to 575° F. as the extent of hydrogenation decreased, and was held at that value during the substantially complete desulfurization of 874 volumes of sulfur-containing charge, when the hydrogenation in the following step of the process became inadequate.

The effluent mixture of saturated hydrocarbon, unsaturated hydrocarbon, and hydrogen was then passed through a heat exchange system whereby the temperature was adjusted to 275° F., and the mixture was then passed into a second hydrogenation chamber containing active catalyst as described in Comparative Experiment I. As the olefin content of the charge increased, as a result of deactivation of the catalyst in the first stage of the process, the temperature rise through the catalyst increased slowly. After about 340 volumes of olefin which had been completely desulfurized and partially hydrogenated in the first step of the process had been completely hydrogenated in this second step, the olefin content of the product approached 0.5 per cent. The temperature was then gradually increased until the inlet temperature had reached 560° F., when the effluent temperature from the reactor was 650° F. As the olefin content of the product increased above 0.5 per cent after a total of 874 volumes of olefin had been completely hydrogenated, this operation was stopped.

The flow to the catalyst in the second stage of the process was changed so that this catalyst became the catalyst for the first stage, to which was then charged the sulfur-containing olefin together with paraffinic diluent and hydrogen-containing gas, for desulfurization and partial hydrogenation at an initial charge temperature of 550 to 560° F. A catalyst chamber containing freshly prepared or reactivated catalyst was then connected as the second stage or hydrogenation step for repetition of the cycle.

The foregoing example and comparative experiments are recorded to illustrate the advantages of the particular operating conditions of the herein disclosed process. Many other examples, differing in minor details but within the scope of this invention, could be cited. Hence, the invention should not be restricted except by the terms or the spirit of the appended claim.

I claim:

A process of substantially completely desulfurizing and nondestructively hydrogenating a sulfur-containing olefin hydrocarbon stock consisting essentially of olefin hydrocarbon which comprises in the first stage contacting one volume of the olefinic stock mixed with substantially three volumes of a paraffinic diluent and substantially 125% of the amount of hydrogen stoichiometrically sufficient to hydrogenate the mixture, with a sulfur-poisonable elemental metal hydrogenation catalyst consisting of a composite nickel and copper metal hydrogenation catalyst supported on alumina at an initial inlet temperature of substantially 540° F. and a charge rate of substantially two volumes of olefin per volume of catalyst per hour, and increasing the inlet temperature to substantially 575° F. as the extent of hydrogenation decreases, then cooling the resulting effluent mixture of saturated hydrocarbon, unsaturated hydrocarbon, and hydrogen, to substantially 275° F., contacting said effluent mixture in the second stage with enough additional hydrogen to provide substantially 125% of the amount of hydrogen stoichiometrically sufficient to hydrogenate the mixture with an active sulfur-poisonable metal hydrogenation catalyst consisting of a composite nickel and copper hydrogenation catalyst supported on alumina, at substantially 275° F., and as the olefin content of said effluent mixture increases as a result of deactivation of the catalyst in the first stage of the process increasing the temperature slowly until the inlet temperature of the second stage is 560° F., and then changing the flow of fluids and repeating the method employing the catalyst in the second stage as the catalyst for the first stage and substituting fresh catalyst for the second stage and removing the prior first stage catalyst completely from the process.

JAMES A. REID.